Jan. 24, 1961     J. A. HERRMANN ET AL     2,969,438
BUSWAY SYSTEM INCLUDING ROLLER HANGERS
Filed June 17, 1957                   3 Sheets-Sheet 1
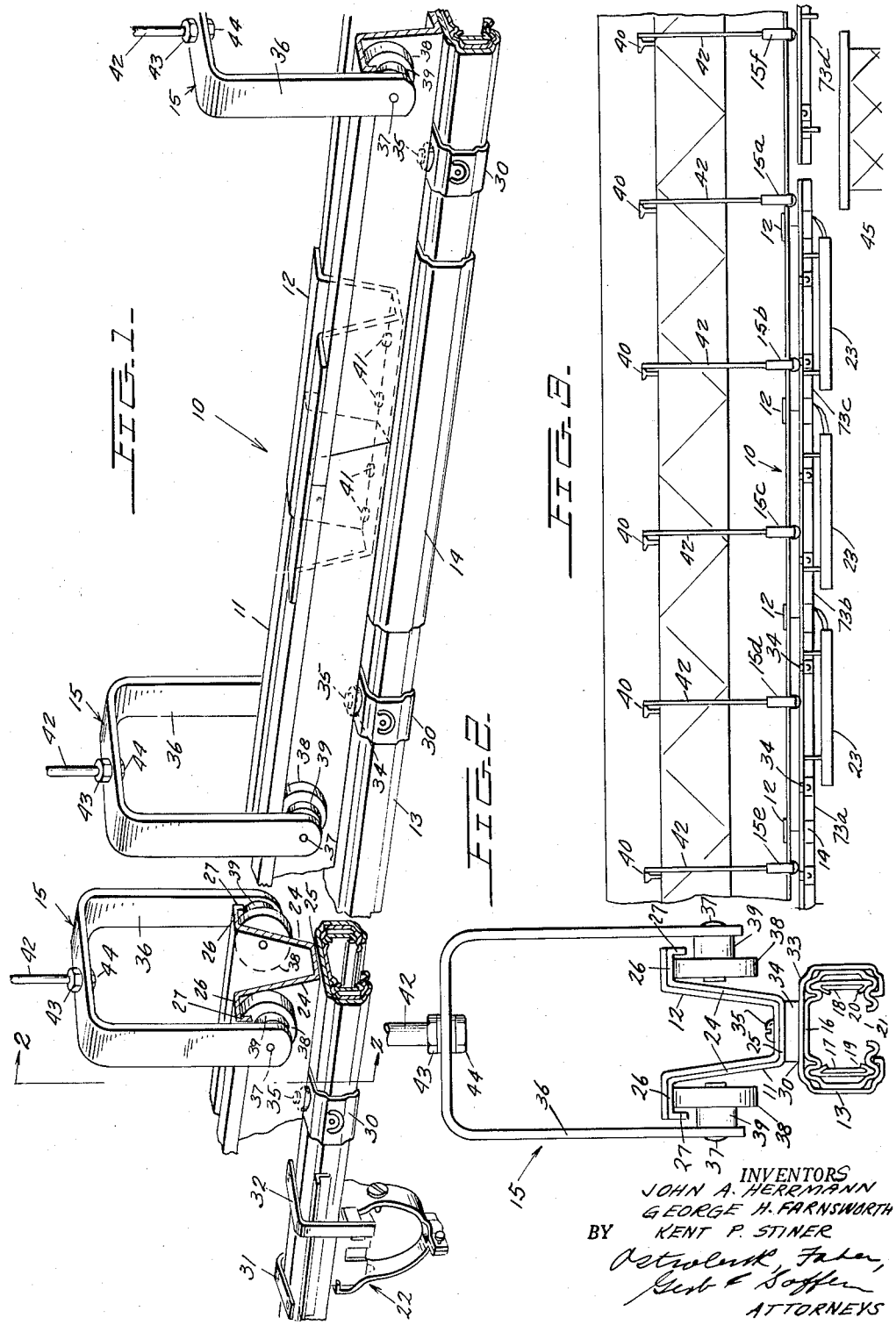
INVENTORS
JOHN A. HERRMANN
GEORGE H. FARNSWORTH
BY    KENT P. STINER
ATTORNEYS

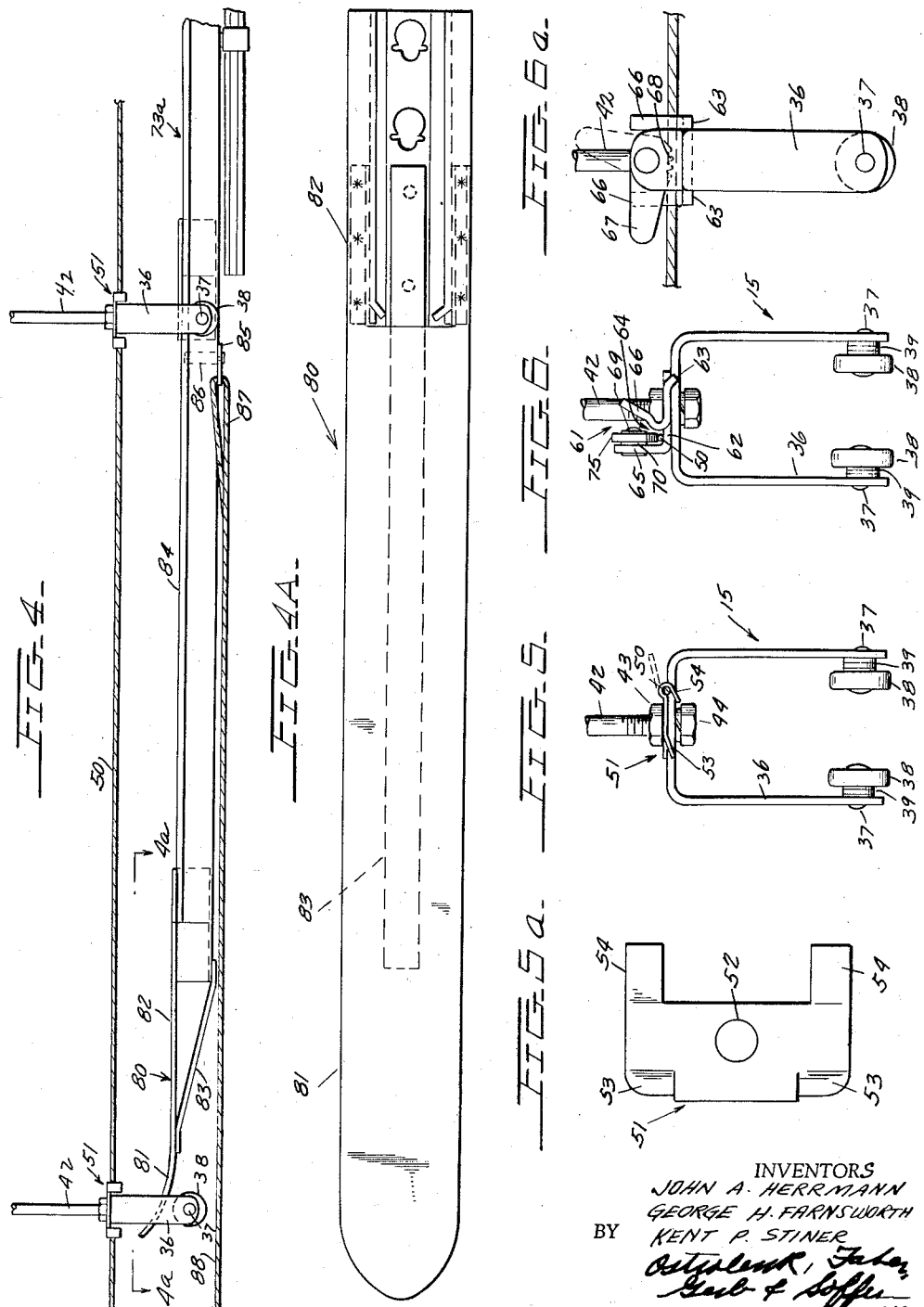

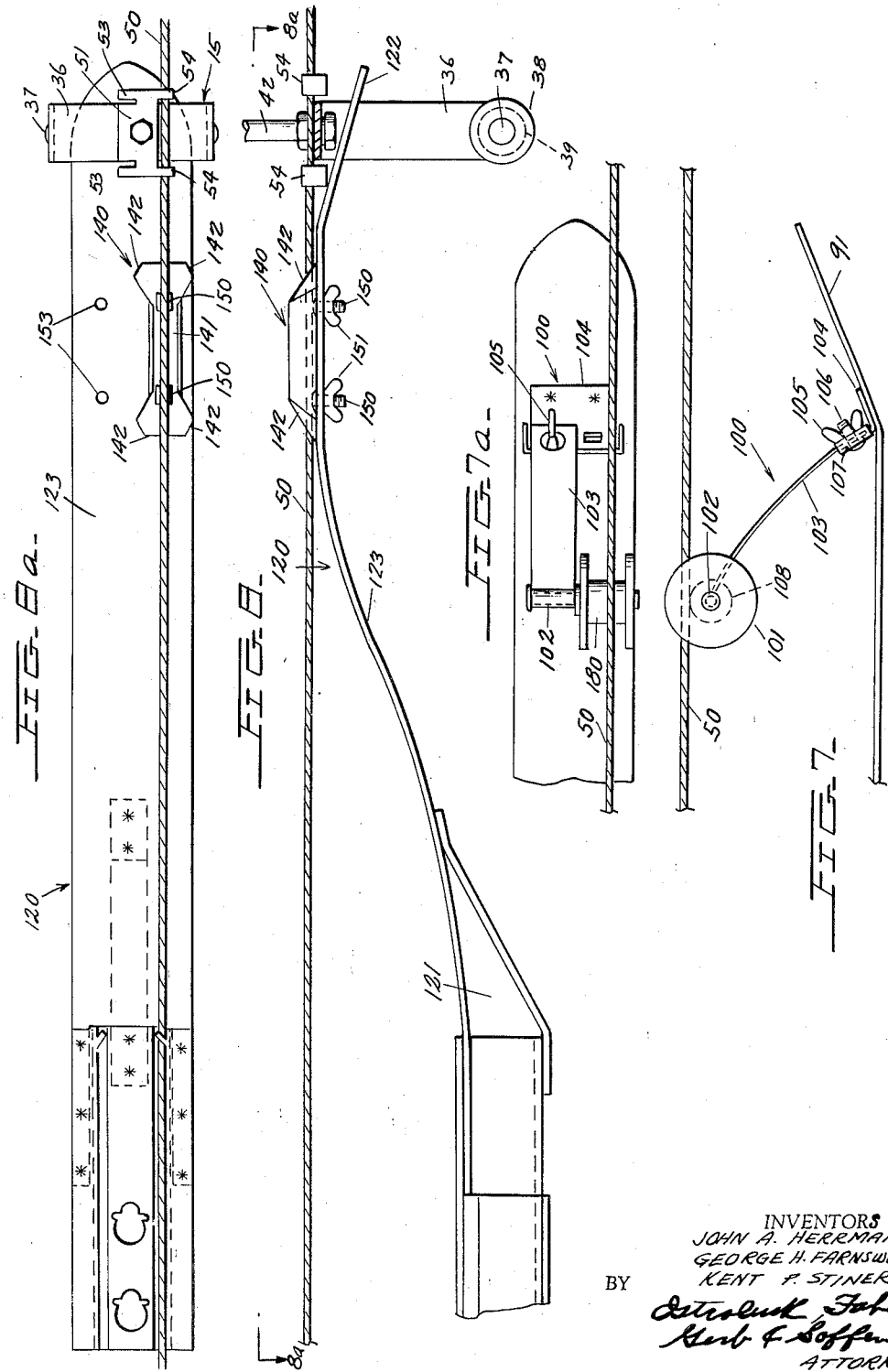

United States Patent Office 2,969,438
Patented Jan. 24, 1961

2,969,438

BUSWAY SYSTEM INCLUDING ROLLER HANGERS

John A. Herrmann, Grosse Pointe Farms, and George H. Farnsworth and Kent P. Stiner, Detroit, Mich., assignors, by mesne assignments, to I-T-E Circuit Breaker Company, Philadelphia, Pa., a corporation of Pennsylvania Filed June 17, 1957, Ser. No. 666,143

10 Claims. (Cl. 191—23)

This invention relates to a busway system and more particularly to an installation arrangement for a trolley duct run whereby the duct run may be installed from a single point.

Heretofore, duct having electrical conductors disposed therein, such as the bus duct disclosed in Patent 2,014,729 and the trolley duct disclosed in Patent 2,158,656, both of which are assigned to the assignee of the instant invention, was installed on a messenger cable or on fixed supports. Installation required a work platform to be moved to each point of installation to support the duct sections as they were added to the system. This method of installation is quite satisfactory when the floor space below the duct path is clear of machines or benches, which is rarely true except for installations made in new buildings or in newly rented space. But under usual crowded conditions it is a difficult and time consuming task to move a supporting platform between installation locations. Even in cases when the floor below the installation is clear, the floor may be unfinished making the erection of scaffolding a costly process. In some instances other workcrews may require unobstructed paths to do their work rather than lose time by having to circumvent erected scaffolding. Since trolley duct usually is supplied in ten foot lengths, the handling of the duct sections in crowded areas is also an awkward matter.

Our installation arrangement comprises a plurality of hangers spaced so that the trolley duct may be slidably positioned along the path defined by the hangers. The hangers are stationary inverted U-shaped members having rollers rotatably mounted on horizontal axes at the ends of the U-arms. Adapted to ride on the rollers is a U-shaped structural member having sufficient rigidity to span a ten foot distance. Projections extend outwardly from the arms of the U-shaped structural member to act as tracks. The trolley duct is secured to the web of the structural member by means of conventional mounting brackets.

First the U-hangers are suspended from suitable supports, such as roof trusses, and positioned in a straight line to define a path for the trolley duct. A work platform is then set up at a convenient location along the duct run. A first section of U-shaped structural support member with a guide end section attached is then passed through the nearest hanger to the hanger adjacent thereto with the tracks of the structural support member riding on the rollers of the U-hanger. Mechanical connection is then made between the first section and a second section of structural support member having a trolley duct secured thereto. The connected second section is then rolled through the nearest U-hanger which forces the first section ahead of it through the next unoccupied roller in the path. A third section is next connected electrically and mechanically to the second section and then rolled into place to be supported by the U-hangers. This process is repeated until all the sections of the trolley duct are connected and the run is completed which permits continuous access to the trolley duct conductors through a duct opening which faces the ground below.

The cooperation of the rollers mounted on horizontal spindles and wide faced tracks assures free passage of the structural support member through the U-hangers even though there is some misalignment of the U-hangers. If the rollers were to be mounted on vertical spindles with the rails between the spindles, the spacing between rollers would be critical with a misalignment of the U-hangers or rollers causing the rollers and rails to bind.

Our installation arrangement permits the trolley duct sections to be joined and installed with appliances, lighting fixtures, and feed-in devices having been installed to the duct before the duct is rolled on to the U-hangers. Even appliances, such as the twistout plug disclosed in copending application Serial No. 584,342, filed May 11, 1956 and assigned to the assignee of the instant invention, which extend over the sides and top of the duct may be installed prior to positioning the duct without interfering with the rollers or track.

In many instances it may be desirable to stretch a stabilizing cable, which is secured to fixed supports along the bus run and fasten the U-hangers thereto. When so fastened the U-hangers are stabilized to prevent swaying especially in planes parallel to the direction in which the trolley duct is rolled and are also stabilized to a more limited degree against transverse swaying.

When the U-hangers are mounted far apart and when the run is exceptionally long, guide means are provided to lead the trolley duct sections through the U-hangers. The guide means in each case includes a tapered inclined nose.

As a further refinement, systems having a stabilizing cable may be provided with an auxiliary guide means which includes a roller or sliding type follower which is in operative engagement with the stabilizing cable thereby providing positive guidance for the nose of the guide means.

Thus we have provided spaced roller hangers which permit a complete straight trolley duct run to be installed from a single point. Possibilities of the duct jamming in the roller U-hangers are minimized by mounting the rollers on horizontal spindles and providing tracks that are considerably wider than the rollers upon which the tracks ride. Furthermore, any type appliance may be installed on the bus duct before the duct is positioned by the U-hangers without interfering with the tracks or rollers or otherwise hampering the installation of the duct on the U-hangers.

Accordingly, a primary object of our invention is to provide an installation arrangement for a trolley duct system whereby the trolley duct may be installed from a single point along a straight trolley run.

Another object is to provide a series of spaced roller hangers in which support members secured to the bus duct sections are slidably mounted.

Still another object is to provide the roller hangers with spaced rollers mounted on horizontal spindles.

A further object is to provide tracks to cooperate with the rollers, the tracks being considerably wider than the rollers to prevent jamming therebetween.

A still further object is to provide a single point mounting arrangement which permits appliances to be premounted on the duct before the duct is rolled into its final position.

Another object is to provide a single point mounting arrangement for trolley duct that provides a continuous unobstructed opening for access to the bus bars within the duct, with the opening facing the ground below, thus enabling a trolley collector to be used with the bus duct.

Another object is to provide a rigid structural member to support one or more lengths of trolley duct, Yet another object is to provide a stabilizing cable to prevent swaying of the hangers.

Still another object is to provide guide means and auxiliary guide means, which precede the first trolley duct section as it is being installed, for the purpose of treading the trolley duct through succeeding U-hangers.

These and other objects of our invention will become apparent after reading the following description together with the appended drawings in which:

Figure 1 is a perspective view of the trolley duct run showing details of the trolley duct, the support members, and the U-hanger units.

Figure 2 is a section taken through line 2—2 of Figure 1 looking in the direction of arrows 2—2.

Figure 3 is a side elevation of a section of a trolley duct run which does not include a stabilizing cable.

Figure 4 is a side elevation of the leading end of a trolley duct run wherein a guide means is employed to thread the trolley duct and support member assemblies through the U-hangers and a cable is provided for stabilizing purposes.

Figure 4a is an enlarged section taken through the line 4a—4a of Figure 4 looking in the direction of arrows 4a—4a.

Figure 5 is a side elevation of a cable gripper device secured to a U-hanger.

Figure 5a is an enlarged plan view of the gripper device of Figure 5.

Figure 6 is a side elevation of a second cable gripper device secured to a U-hanger.

Figure 6A is an end view of Figure 6.

Figure 7 is a side elevation of a guide means coordinated with an auxiliary guide means.

Figure 7A is a plan view of the guide and auxiliary guide means of Figure 7.

Figure 8 is a side elevation of another embodiment of a coordinated guide and auxiliary guide means.

Figure 8A is a plan view of Figure 8 taken through the line 8—8.

Referring more particularly to Figures 1–3, the trolley duct run 10 comprises a plurality of U-hanger units 15 positioned at regular spaced intervals along a straight line, a plurality of support members 11 connected end to end by connecting means 12 and slidably mounted to U-hanger units 15. A plurality of bus duct sections 13 are electrically and mechanically connected end to end by connecting means 14, and depend from the support members 11. The operation and construction of connecting means 14 is fully disclosed in copending application Serial No. 588,141, filed May 29, 1956 and assigned to the assignee of the instant invention.

For illustrative purposes the duct and bus bars disposed therein consist of trolley duct sections 13 each comprising a metal housing or duct 16 having an appropriate shape for the retention therein of bus bars 17, 18 and their respective insulators 19, 20. It is to be understood that the trolley duct 13 though illustrated as having two bus bars 17, 18 may have a single bus bar or three or more bus bars according to the electrical system involved. Duct 16 includes a longitudinal opening 21 which is positioned to face the ground and through which access may be had to the bus bars 17, 18 by means of a trolley collector (not shown) or a tap-off unit 22 which is of the type disclosed in copending application Serial No. 584,342, filed May 11, 1956 and assigned to the assignee of the instant invention.

Support member 11 is a structural member of sufficient rigidity to support the mechanical load of a ten foot length of trolley duct 13 together with the fixtures, such as tap-off unit 22 and fluorescent lamp units 23, normally attached thereto. Support member 11 has a generally U-shaped cross section with arms 24 extending upwardly from base 25. Tracks 26 extend horizontally outwardly from the free ends of arms 24 while ears 27 extend downwardly from the free ends of horizontal tracks 26. The cross section of coupling means 12 is generally the same as that of support member 11 with the ears 27 omitted. Fasteners 41 join two support members 11 end to end to a coupling means 12.

At least two connector means or brackets 30 secure each trolley duct section 13 to its associated support member 11 in spaced parallel relationship which permits premounting of appliances which have securing means which run along the sides and top of the trolley duct 13. Such an appliance is tap-off unit 22 whose mounting legs 31, 32 run along the sides of the housing 16 from the top to the bottom. Each connector means 30 comprises a clamp 33, a spacer 34, and a rivet 35. Clamp 33 grasps the housing 16 while the spacer 34, which is secured to clamp 33 by suitable means, is interposed between the duct section 13 and the support member 11 to provide the spacing therebetween. Rivet 35, or another equivalent fastener, is introduced through a hole in the base 25 and received by a hole in the spacer 34.

Each hanger unit 15 comprises an inverted U-shaped member 36 having horizontal spindles 37 extending inwardly from the free ends of the U-arms. Mounted on the spindles 37 in spaced relationship are vertical rollers 38 upon which tracks 26 are supported. Collars 39 space the rollers 38 from the U-arms.

The width of tracks 26 is made considerably greater than the width of rollers 38 to compensate for misalignment of the hanger units 15. Ears 27 at the end of tracks 26 serve to prevent the support member 11 from falling off the rollers 38 should the arms of inverted U-member 36 attempt to spread outwardly.

Referring more particularly to Figure 3, installation of a reasonably short trolley duct run 10 proceeds as follows:

(1) The hanger units 15 are secured to fixed members, such as the structural members 40 of a building by means of rods 42 or other suitable hangers. Rods 42 must be oriented in a single plane and hanger units 15 must be located in a straight line in that plane with the final adjustments being made using nuts 43, 44.

(2) A work platform 45 is located at a single convenient point along the run.

(3) A first trolley duct section 13 and its associated support member 11 form assembly 73a which is introduced at hanger unit 15a and shoved through to hanger unit 15b, so that the assembly 73a is fully supported.

(4) A second trolley duct section 13 and its associated support member 11 forming assembly 73b is joined to assembly 73a by connecting means 12 and 14. Assembly 73b is then shoved to the left (Figure 3) forcing assembly 73a to the left through hanger unit 15c. The lead assembly 73a will always find the next hanger unit 15 since the support members 11 are of sufficient rigidity to support a free length of trolley duct section 13 without allowing any perceptible sag.

(5) The same procedure is followed with the remaining assemblies 73c, 73d, etc., until trolley duct run 10 is complete.

If a support is required while the connecting means 12 and 14 are being installed, the assembly may be introduced to hanger unit 15f to the right as at 73d. Connecting means 12 and 14 are then installed and the assembly is pushed to the left through hanger unit 15a shoving the other assemblies ahead of it.

Appliances such as, a feed-in device (not shown), lighting fixtures 23 and tap-off units 22 may be prepositioned on the assemblies before the assemblies are introduced to the hanger units 15.

Now referring more particularly to Figures 4–6a stabilizing cable 50, which is stretched between fixed supports to act as a stabilizer for U-hangers 15, may be added to the trolley duct run of Figure 3. When U-hangers 15 are secured to cable 50 by gripping device 51 U-hangers 15 are completely prevented from swaying in a plane parallel to the direction in which the trolley duct 13 is rolled. Transverse swaying is also reduced to a minimum.

Gripping device 51 is constructed of thin sheet steel of substantially rectangular shape having hole 52 cut therethrough. Rod 42 passes through hole 52 and then through a hole in the web of U-hanger 15 and by means of nuts 43 and 44 threaded on rod 42, gripping device 51 is secured to U-hanger 15. Downwardly bent tabs 53 straddle U-hanger 15 to prevent rotation of gripping device 51 while ears 54 are twisted, from the straight or open position shown dotted in Figure 5, over cable 50 to a closed position wherein U-hanger 15 is firmly secured to cable 50.

A second gripper device 61, illustrated in Figures 6 and 6a, is also constructed of thin sheet metal and comprises a body section 62 which lies adjacent to U-member 15. Tabs 63 extend downwardly to straddle U-member 15 and thereby prevent rotation of gripper device 61. A V-shaped pocket 64 is formed by arm 65 which extends upwardly at right angles to body 62 and inclined arms 66, on each side of arm 65, which also extend upwardly from body 62.

Clamp member 67, having serrations 68 on the edge thereof, is pivotally mounted to arm 65 by rivet 69. Cup-shaped spring washer 70, interposed between arm 65 and clamp member 67, is partially compressed to introduce friction and prevent accidental rotation of clamp member 67.

Cable 50 is slipped into V-pocket 64 when gripper device 61 is open, that is, when clamp member 67 is in the dotted position of Figure 6a. Gripping device 61 is closed by rotating clamp member 67 counterclockwise to the position of Figures 6 and 6a. In the closed position serrations 68 engage cable 50 to firmly secure U-hanger 15 to stabilizing cable 50.

When the distances between U-hangers 15 are exceptionally great or the trolley duct run is exceptionally long, the first assembly 73a of trolley duct 13 and support member 11 may be preceded by guide means 80. Guide means 80 comprises a flat steel strip section 82 and an inclined tapered nose section 81 which readily finds its way between the arms of U-hanger 15. A stiffening rib 83 extends along the center of steel strip 82.

Structural member 84, which may be identical to support member 11, is preferably interposed between guide means 80 and the first assembly 73a. However, guide means 80 may be secured directly to the support member 11 of the first assembly 73a. Flat strip section 82 is substantially equal in width to the distance between ears 27 and in substantially the same plane with tracks 26.

Pulling attachment 85, which is a flat plate having a single tapped hole and two clearance holes (not shown) is secured to structural member 84 by stud 86. Sling 87 is threaded through the clearance holes of pulling attachment 85 and then is secured to pulling cable 88 thereby enabling the joined trolley duct sections to be pulled and be guided from the entering end as required.

A second guide means 90 (Figures 7 and 7a) similar to guide means 80, is provided with auxiliary guide 100 which operatively engages cable 50 to positively guide inclined tapered nose 91 into U-hanger 15. Auxiliary guide 100 comprises a follower or pulley 101 freely mounted for rotation on pin 102 at one end of resilient member 103. The other end of resilient member 103 is adjustably mounted to bracket 104, this adjustment being effected by the changing of the nesting position of wing nut 105 and screw 106 in one elongated bracket opening 107. Bracket 104 is welded or otherwise secured to nose 91 near its junction with horizontal section 92.

In a trolley duct run having a stabilizing cable 50, cable 50 will be positioned in pulley groove 108. As nose 91 is pushed forward by first assembly 73a cable 50 will act as a guide to make the threading of nose 91 with the U-hangers 15 more of a certainty. Resilient member 103 is lightly flexed thereby urging pulley 101 upward toward cable 50. Member 103 is sufficiently flexible to permit pulley 101 to pass through U-hangers 15.

Figures 8 and 8a illustrate another guide means 120 and auxiliary guide means 140. Guide means 120 comprises a substantially rigid section 121, a downwardly inclined and tapered nose 122 and an upwardly inclined resilient section 123 between the rigid section 121 and the nose 122. Auxiliary guide means 140 comprises a follower or elongated member 141 having a generally U-shaped cross section with the U-arms at each end of elongated member 141 being flared outwardly at 142 to reduce the wear of stabilizing cable 50.

Screws 150 passing through two of the four holes 153 in resilient section 123 together with wing nuts 151 removably secure auxiliary guide means 140, to resilient section 123 near its junction with nose 122. The four holes 153 have been provided in order that auxiliary guide means may be positioned near either edge of guide resilient section 123. Resilient section 123 urges auxiliary guide means 140 upward so that stabilizing cable 50 is positioned between the U-arms of guide means 140. Thus nose 122 will be effectively guided to locate the U-hangers 15 in the same manner as nose 91 was guided by auxiliary guide means 100

Thus we have provided a trolley duct installation arrangement whereby all the duct sections 13 of a trolley duct run 10 may be installed from a single point along the run. Appliances, even those that extend along the sides of the housing 16, may be prepositioned without interfering with the installation. The vertical rollers 38, mounted on horizontal spindles 37, cooperating with wide tracks 26 prevent binding even though the U-hanger units 15 be misaligned.

In the foregoing we have described our invention solely in connection with specific illustrative embodiments thereof. Since many variations and modifications of the invention will now be obvious to those skilled in the art, we prefer to be bound not by the specific disclosures herein contained but only by the appended claims.

We claim:

1. A duct run comprising a plurality of hanger units, a plurality of elongated duct sections, a plurality of elongated support members, one for each of said duct sections; said duct sections being joined end to end; said support members being joined end to end; said duct sections depending from said support members and extending generally parallel thereto; said plurality of hanger units being positioned at spaced intervals along a straight line in a horizontal plane; each of said hanger units including two rollers in horizontally spaced relationship rotatably mounted on horizontal spindles; each of said support members comprising a generally U-shaped cross section having tracks projecting horizontally from the ends of the U-arms; said tracks operatively positioned in sliding engagement with said rollers; a plurality of longitudinally extending elongated bus bars disposed within said duct; each of said duct sections having a longitudinal opening therein for access to said bus bars; said longitudinal opening being operatively positioned for access from below the duct run with the longitudinal openings of each of said bus duct sections being aligned to form a continuous unobstructed opening accessible for the entire length of said duct run.

2. A duct run comprising a plurality of hanger units, a plurality of elongated duct sections, a plurality of elongated support members, one for each of said duct sections; said duct sections being joined end to end; said support members being joined end to end; said duct sections depending from said support members and extending generally parallel thereto; said plurality of hanger units being positioned at spaced intervals along a straight line in a horizontal plane; each of said hanger units including two rollers in horizontally spaced relationship rotatably mounted on horizontal spindles; each of said support members comprising a structural member having a generally U-shaped cross section including a base and two arms projecting upwardly from said base, horizontal tracks extending outwardly from the free ends of said arms, ears extending downwardly from the free ends of said horizontal tracks; said horizontal tracks operatively positioned in sliding engagement with said rollers; a plurality of longitudinally extending elongated bus bars disposed within said duct; each of said duct sections having a longitudinal opening therein for access to said bus bars; said longitudinal opening being operatively positioned for access from below the duct run with the longitudinal openings of each of said bus duct sections being aligned to form a continuous unobstructed opening accessible for the entire length of said duct run.

3. A duct run comprising a plurality of hanger units, a plurality of elongated duct sections, a plurality of elongated support members, one for each of said duct sections; said duct sections being joined end to end; said support members being joined end to end; said duct sections depending from said support members and extending generally parallel thereto; said plurality of hanger units being positioned at spaced intervals along a straight line in a horizontal plane; each of said hanger units including two rollers in horizontally spaced relationship rotatably mounted on horizontal spindles; each of said support members comprising a structural member having a generally U-shaped cross section including a base and two arms projecting "upwardly" from said base, horizontal tracks extending outwardly from the free ends of said arms, ears extending downwardly from the free ends of said horizontal tracks; said horizontal tracks operatively positioned in sliding engagement with said rollers; a plurality of longitudinally extending elongated bus bars disposed within said duct; each of said duct sections having a longitudinal opening therein for access to said bus bars; said longitudinal opening being operatively positioned for access from below the duct run; said horizontal tracks being wider than said rollers to compensate for misalignment of said hanger units and prevent binding of said hanger units and said support members; said duct sections installable from a single point along the bus duct run.

4. A duct run comprising a plurality of hanger units, a plurality of elongated duct sections, a plurality of elongated support members, one for each of said duct sections; said duct sections being joined end to end; said support members being joined end to end; said duct sections depending from said support members and extending generally parallel thereto; said plurality of hanger units being positioned at spaced intervals along a straight line in a horizontal plane; each of said hanger units including two rollers in horizontally spaced relationship rotatably mounted on horizontal spindles; each of said support members comprising a structural member having horizontal tracks operatively positioned in sliding engagement with said rollers; said horizontal tracks being wider than said rollers to compensate for misalignment of said hanger units and prevent binding of said hanger units and said support members; said bus duct sections installable from a single point along the duct run.

5. A duct run comprising a plurality of hanger units, a plurality of elongated duct sections, a plurality of elongated support members, one for each of said duct sections; said duct sections being joined end to end; said support members being joined end to end; said bus duct sections being secured to said support members in spaced parallel relationship; said plurality of hanger units being positioned at spaced intervals along a straight line in a horizontal plane; each of said hanger units including two rollers in horizontally spaced relationship rotatably mounted on horizontal spindles; said support members operatively positioned in sliding engagement with said rollers and supported thereby.

6. The combination of an elongated support member and a trolley duct member depending therefrom and extending generally parallel thereto said duct member including a conducting strip and a housing member; said support member comprising a structural member having a generally U-shaped cross section including a base and two arms projecting from said base, tracks extending from the free ends of each of said arms, said tracks being positioned in coplanar relationship; an ear extending from the free ends of each of said tracks and substantially perpendicular thereto.

7. A duct run comprising a plurality of hanger units, a plurality of elongated duct sections, a plurality of elongated support members, one for each of said duct sections; said duct sections being joined end to end; said support members being joined end to end; said bus duct sections being secured to said support members in spaced parallel relationship; said plurality of hanger units being positioned at spaced intervals along a straight line in a horizontal plane; each of said hanger units including two rollers in horizontally spaced relationship rotatably mounted on horizontal spindles; said support members operatively positioned in sliding engagement with said rollers and supported thereby; a stabilizing cable extending parallel to said duct run; a gripping device securing each of said hanger units to said stabilizing cable; said gripping device including a pivotally mounted clamp member having serrations on an edge thereof.

8. A duct run comprising a plurality of hanger units, a plurality of elongated duct sections, a plurality of elongated support members; said duct sections being joined end to end; said support members being joined end to end; said bus duct sections being secured to said support members and extending substantially parallel thereto; said plurality of hanger units being positioned at spaced intervals along a straight line in a horizontal plane; each of said hanger units including two rollers rotatably mounted in horizontally spaced relationship; said support members operatively positioned in sliding engagement with said rollers and supported thereby; a guide means operatively connected to a first end of said support members joined end to end; said guide means including a nose section at the free end thereof; said guide means being operable to guide said support members on to said rollers during installation of said duct run.

9. A duct run comprising a plurality of hanger units, a plurality of elongated duct sections, a plurality of elongated support members; said duct sections being joined end to end; said bus duct sections being secured to said support members and extending generally parallel thereto; said plurality of hanger units being positioned at spaced intervals along a straight line in a horizontal plane; each of said hanger units including two rollers rotatably mounted in horizontally spaced relationship; said support members operatively positioned in relatively movable engagement with said rollers and supported thereby; a stabilizing cable extending parallel to said duct run; a gripping device securing each of said hanger units to said stabilizing cable; a guide means operatively connected to a first end of said support members joined end to end; said guide means including a nose section; said guide means being operable to guide said support members on to said rollers during installation of said duct run; a resiliently mounted auxiliary guide means; said auxiliary guide means including a follower biased into operative engagement with said stabilizing cable; said auxiliary guide means being operable to positively guide said nose section through said hanger units during installation of said duct run.

10. A duct run comprising a plurality of hanger units, a plurality of elongated duct sections, a plurality of elongated support members, one for each of said duct sections; said duct sections being joined end to end; said support members being joined end to end; said bus duct sections being secured to said support members in spaced parallel relationship; said plurality of hanger units being positioned at spaced intervals along a horizontal straight line; each of said hanger units including two rollers in horizontally spaced relationship rotatably mounted on horizontal spindles; said support members operatively positioned in sliding engagement with said rollers and supported thereby; a stabilizing cable extending parallel to said duct run; a gripping device securing each of said hanger units to said stabilizing cable; a guide means operatively connected to a first end of said support members joined end to end; said guide means including an inclined tapered nose section; said guide means being operable to guide said support members on to said rollers; a resiliently mounted auxiliary guide means operatively connected to said guide means; said auxiliary guide means including a follower biased into operative engagement with said stabilizing cable; said auxiliary guide means being operable to positively guide said nose section through said hanger units during installation of said duct run; a pulling attachment operatively connected to said first end of said support members joined end to end; a pulling cable secured to said pulling attachment.

References Cited in the file of this patent

UNITED STATES PATENTS

| | | |
|---|---|---|
| 346,990 | Finney | Aug. 10, 1886 |
| 461,785 | Pfouts | Oct. 20, 1891 |
| 1,055,691 | Aalborg | Mar. 11, 1913 |
| 1,475,146 | Septer | Nov. 20, 1923 |
| 1,627,733 | Fritts | May 10, 1927 |
| 1,706,069 | Marquardt | Mar. 19, 1929 |
| 2,096,313 | Anderson | Oct. 19, 1937 |
| 2,416,352 | Seward | Feb. 25, 1947 |
| 2,626,298 | Hammerly | Jan. 20, 1953 |
| 2,626,301 | Hammerly | Jan. 20, 1953 |
| 2,641,428 | Kirk et al. | June 9, 1953 |
| 2,696,533 | Hammerly et al. | Dec. 7, 1954 |

FOREIGN PATENTS

| | | |
|---|---|---|
| 141,914 | Great Britain | Apr. 29, 1920 |